United States Patent Office 3,068,153
Patented Dec. 11, 1962

3,068,153
SUNBURN PREVENTIVE COMPOSITIONS
Edward L. Morehouse, Snyder, N.Y., assignor to Union Carbide Corporation, a corporation of New York
No Drawing. Filed Nov. 13, 1958, Ser. No. 773,573
14 Claims. (Cl. 167—90)

This invention relates in general to ultraviolet light absorbing compositions. More particularly, this invention is concerned with novel ultraviolet light absorbing compositions that are useful as sunburn preventives when applied to the human skin. These compositions contain as the active ingredient an organosilicon compound that absorbs the burning ultraviolet radiation of sunlight.

The present application is a continuation in part of patent application Serial No. 615,449 filed on October 12, 1956, and which issued as U.S. 2,929,829 on March 22, 1960.

It is known that solar rays having a wave length of from about 2500 to 3100 Angstrom units (i.e. rays of the ultraviolet spectrum) cause severe burning of human skin upon over-exposure to such rays. To diminish the burning and protect human skin, organic ultraviolet light absorbing compounds have been added to lotions and creams that are applied to the human body. These lotions and creams are generally called "suntan" compositions. Among the organic ultraviolet light absorbing compounds that are used in these "suntan" compositions are, for example, ortho and para-amino benzoic acid and their derivatives, salicyclic acid and its derivatives, coumarin and the carbostyril derivatives. A list of the various ultraviolet light absorbing compounds has been tabulated with reference to the literature [A. C. Giese et al., Journal Amer. Pharm. Assoc., Scientific Edition, 39, 30 (1950)].

The presently known "suntan" compositions, in which organic ultraviolet absorbing compounds are used, take the form of emulsions, creams, oils or alcoholic solutions. Also known are "suntan" compositions which contain silicone oils such as dimethylsiloxane oils and phenylmethylsiloxane oils as inert ingredients in addition to an organic ultraviolet light absorbing compound. In the known "suntan" compositions the organic ultraviolet light absorbing compound is extractable by water and as a result the organic ultraviolet light absorbing compound is readily leached out by the action of water such as, for example, when swimming. Thus, the "suntan" composition must be reapplied upon leaving the water, if adequate protection from the burning solar rays is to be obtained.

It is an object of this invention to provide sunburn preventive compositions from which the ultraviolet light absorbing compound is not readily removed by the mere action of water. More particularly, it is the object of this invention to provide sunburn preventive compositions in which the ultraviolet light absorbing compound is an organosilicon compound, containing silicon-bonded acylaminoalkyl groups, said organosilicon compound absorbs ultraviolet light in the range of from about 2400 to 3100 Angstrom units, and are not readily removed by the action of water and thereby need not be reapplied after immersion in water.

The novel, ultraviolet light absorbing, sunburn preventive compositions of this invention are those sunburn preventive compositions which contain as the active ultraviolet absorbing ingredient an organosilicon compound containing at least one silicon-bonded acylaminoalkyl group of the formula:

where R is selected from the group consisting of ortho- and para-aminobenzoyl groups, ortho and p(N-alkyl)-aminobenzoyl groups, ortho and para (N,N-dialkyl)-aminobenzoyl, salicyloyl groups, cinnamoyl groups, and naphthoyl groups, said organosilicon compound is selected from the class consisting of organosilanes having at least one valence of silicon, other than the valence satisfied by the acylaminoalkyl group, satisfied by an alkoxy group, the remaining valences of silicon being satisfied by monovalent hydrocarbon groups or alkoxy groups and organopolysiloxanes having all of the valences of silicon other than the valences satisfied by said acylaminoalkyl group and siloxane linkages, satisfied by monovalent hydrocarbon groups. The monovalent hydrocarbon groups are, for example, an alkyl group such as methyl, ethyl, butyl and the like, an aryl group such as phenyl, naphthyl, tolyl and the like or an aralkyl group such as benzyl and the like; and the alkoxy groups are, for example, methoxy, ethoxy, propoxy and 2-ethylhexoxy and the like, as disclosed in my above-identified copending patent application.

The acylaminoalkyl silicon compounds employed in the compositions of this invention include monomeric acylaminoalkylalkoxysilanes, acylaminoalkylsiloxanes and copolymeric siloxanes containing silicon-bonded acyl-amino-alkylsiloxane groups. The monomeric acylaminoalkylalkoxysilanes employed in the compositions of this invention are those having the formula:

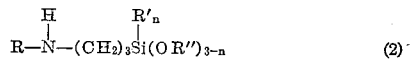

where R has the above-defined meanings, R' represents a monovalent hydrocarbon group, R" represents an alkyl group and $n$ is an integer having a value of from 0 to 2.

The acylaminoalkyl siloxanes employed in the compositions of this invention are those having the unit formula:

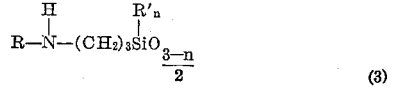

where R, R', and $n$ have the above-defined meanings, but need not be the same throughout the same molecule although $n$ is the same in the same unit.

The copolymeric siloxanes containing silicon-bonded acylaminoalkyl groups employed in the compositions of this invention are those containing at least one unit depicted by Formula 3 and one or more siloxane units depicted by the formula:

where R' has the above-defined value and $b$ is an integer having a value of from 0 through 3. R' and $b$ need not be the same throughout the same molecule, but $b$ is the same in the same unit.

Particularly preferred organosilicon compounds for use in the compositions of this invention are the monomeric silanes of Formula 2 and copolymeric siloxanes of the formula:

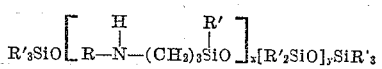

where R and R' have the above-defined meanings, $x$ is an integer having a value of at least 1 and y is an integer of zero or greater, since these organosilicon compounds are liquids and are thus more readily dispersed in the formulations.

The ultraviolet light absorbing, sunburn preventive compositions of this invention comprise a carrier in combination with an acylaminoalkylsilicon compound and include solutions, oils, creams, and lotions as hereinafter described. The effectiveness of the sunburn preventive composition in absorbing ultraviolet light is dependent upon the concentration of the organosilicon compound containing the silicon-bonded acylaminoalkyl groups depicted by Formula 1 present in said composition or upon the thickness of the layer of said organosilicon compound deposited upon the human skin.

The sunburn preventive compositions of this invention contain from 0.1 to 15.0 parts by weight of an acylaminoalkylsilicon compound and from 85 to 99.9% of a non-ultraviolet light absorbing, inert, non-toxic carrier. By the term "carrier" as used herein is meant those materials which do not absorb ultraviolet light that are commonly used as dispersants for organic ultraviolet light absorbing compounds. Among the suitable carriers are, the solvents such as ethanol, isopropanol, glycerine, propylene glycol laurate, mineral oil, propylene glycol, triethanolamine and the like, which are conventionally used in producing suntan lotions. Also included as carriers are the cream base materials. By the term "cream base material" as used herein is meant a cosmetic cream prepared in the conventional manner. Among some of the products used in producing cream base materials are stearic acid, propylene glycol, cetyl alcohol, lanolin, mineral oil, bees-wax, triethanolamine and the like. The amount of the acylaminoalkylsilicon compound employed in the compositions of this invention is adjusted so that a thin film of the composition will absorb greater than 90% of the transmitted ultraviolet light having a wave length of from about 2500 to about 3100 Angstrom units. It will be known to those skilled in the art that sunburn preventive compositions containing lesser amounts of the silicon-bonded acylaminoalkyl group will still absorb some of the ultraviolet light and prevent sunburn in special instances. Those skilled in the art can best determine the amount of the acylaminoalkylsilicon compound needed in their sunburn preventive compositions by measuring the amount of ultraviolet light absorbed by a thin film of the composition by means of an ultraviolet spectrophotometer. Amounts of the acylaminoalkylsilicon compound greater than that described above can also be employed; however, no commensurate advantages are obtained thereby.

In producing the novel sunburn preventive compositions of this invention, a mixture of an acylaminoalkylsilicon compound in a carrier is prepared according to procedures known to those skilled in the art.

The preparation of some sunburn preventative oils, cream and lotion compositions are illustrated by the following general examples.

(1) A preparation of the consistency of cream may be compounded by forming an emulsion of the following materials according to known procedures:

| | Parts by weight |
|---|---|
| Acylaminoalkylsilicon compound | 0.1–15 |
| White mineral oil | 29.–44.9 |
| Lanolin | 25 |
| Water | 31 |

(2) An alcoholic lotion may be compounded by forming a mixture of the following:

| | Parts by weight |
|---|---|
| Acylaminoalkylsilicon compound | 0.1–15 |
| Propylene glycol laurate | 15 |
| Alcohol | 70.–84.9 |

(3) A suntan oil may be compounded by forming a mixture of the following:

| | Parts by weight |
|---|---|
| Acylaminoalkylsilicon compound | 0.1–15 |
| Sesame oil | 36 |
| White mineral oil | 49–63.9 |

In the above preparations coloring agents and perfumes may be added as desired.

The acylaminoalkylsilicon compounds used in the compositions of this invention are produced by reacting the acid halides and esters of ortho- and para-aminobenzoic acid, ortho and para-(N-alkyl)aminobenzoic acid, ortho and para-(N,N-dialkyl)aminobenzoic acid, salicyclic acid, cinnamic acid and naphthoic acid with an aminoalkylsilicon compound wherein the amino group is separated from the silicon by at least 3 carbon atoms of an alkyl group to yield an acylamino alkyl group. These acylaminoalkylsilicon compounds as well as a process for their preparation are disclosed in copending patent application S.N. 615,449, filed October 12, 1956, now U.S. Patent 2,929,-829. Gamma(para-N,N-dimethylbenzoyl)aminopropyl-triethoxysilane can be prepared by reacting ethyl- para-(N,N-dimethyl)benzoate with gamma-aminopropyltriethoxysilane according to the procedure disclosed in the above-identified copending patent application.

The following examples serve to further illustrate my invention, and are not to be construed as limitation, thereon.

EXAMPLE I

In a 100 cc. flask fitted with a magnetic stirrer, still head and thermometer were placed ethyl-p-(N-butylamino)benzoate (5.0 g., 0.0239 mole), xylene (20 ml.), and gamma-aminopropyltriethoxysilane (4.84 g., 0.025 mole). The reactants were heated at reflux over a 4.0 hr. period. After 2.0 hr., 10 cc. of distillate had been removed; 10 cc. of additional xylene was therefore added. After 4.0 hr., the clear solution was cooled and 50 cc. of petroleum ether was added. The solid precipitate was removed by filtration (2.6 g.). The filtrate was then concentrated under reduced pressure at 1 mm. (pot temperature to 230° C.) in a nitrogen atmosphere. The resulting liquid solidified on cooling in an ice bath. Benzene (10 cc.) was added and the solution concentrated under reduced pressure at room temperature over a 16-hr. period. The resulting low melting solid weighed 4.0 g. and was identified as gamma-(para-N-butylaminobenzoyl)aminopropyltriethoxysilane

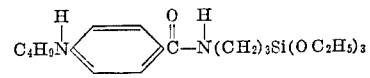

This material was found to absorb ultraviolet light having a wave length of from 2500 A. to 3400 A. The material was soluble in alcohol and 50 cks. dimethylsiloxane oil, but insoluble in water.

EXAMPLE II

In a 100 cc. flask to which was attached a Dean-Stark trap filled with xylene, were placed 20 g. of a siloxane oil of 100 cks. viscosity having the average formula:

$$(CH_3)_3SiO[(CH_2)_3SiO]_{27.3}[H_2N-(CH_2)_3\overset{CH_3}{\underset{|}{Si}}O]_1Si(CH_3)_3$$

20 cc. of xylene, and 1.5 g. (0.011 mole) of p-aminobenzoic acid. The mixture was stirred, using a magnetic stirrer, and heated to reflux (pot temperature=200° C.). Over the course of 12 hrs., water (0.2 cc.) was removed. The xylene was removed under reduced pressure and the resulting siloxane oil product filtered under suction to remove unreacted starting material. The product weighed 18.25 g. and had a viscosity of 1570 cps. The siloxane oil product was found to absorb ultraviolet light having a wave length of from 2400 A. to 3300 A. This siloxane oil product was soluble in ethanol and 50 cks. dimethylsiloxane oil, but insoluble in water.

EXAMPLE III

In a 100 cc. flask to which was attached a Dean-Stark trap filled with xylene were placed 10 g. of a siloxane oil of 15 cps. viscosity having the average formula:

$$(CH_3)_3SiO[(CH_2)_2SiO]_{11.8}[H_2N(CH_2)_3Si(CH_3)O]Si(CH_3)_3$$

20 cc. of xylene, and 1.38 g. (0.01 mole) of salicylic acid. The resulting mixture was heated to reflux for a period of 48 hrs. Water (0.25 cc.) was removed over this period.

Xylene (14 cc.) was distilled off, the solution filtered, and the solution concentrated under reduced pressure to a pot temperature of 150° C. Unreacted salicylic acid sublimed out under these conditions. The product oil was then filtered under suction. The product oil was soluble in ethanol, but insoluble in water. The ultraviolet product oil was found to absorb light having a wave length of from 2500 A. to 3300 A.

EXAMPLE IV

In a 150 cc. beaker were mixed 4.0 g. of an organosilicon compound having a viscosity of 420 cps. and having the average formula:

$$(CH_3)_3SiO[(CH_3)_2SiO]_{11.8}\left[H_2N-C_6H_4-\overset{O}{\overset{\|}{C}}-\overset{H}{\overset{|}{N}}-(CH_2)_3\overset{CH_3}{\overset{|}{Si}}O\right]_3Si(CH_3)_3$$

25 g. of lanolin, 40 g. of mineral oil and 31 g. of water. This mixture was stirred with a mechanical stirrer until a homogeneous emulsion was obtained. This cream-like product was stable for at least one month.

The ultraviolet absorption spectrum of this material was obtained by means of an ultraviolet spectrophotometer. Two drops of the cream were pressed between two quartz plates and the difference between the incident light and the transmitted light, determined by means of an ultraviolet spectrophotometer with the following results.

*Ultraviolet Spectrum*

| Wave length Angstrum units: | Percent transmission |
|---|---|
| 2400–2900 | Less than .001% |
| 3000 | 0.045 |
| 3100 | 0.14 |
| 3200 | 0.56 |

EXAMPLE V

In a 150 cc. beaker were mixed 2.0 g. of an organosilicon compound having a viscosity of 420 cps. and having the average formula:

$$(CH_3)_3SiO[(CH_3)_2SiO]_{11.8}\left[H_2N-C_6H_4-\overset{O}{\overset{\|}{C}}-\overset{H}{\overset{|}{N}}-(CH_2)_3\overset{CH_3}{\overset{|}{Si}}O\right]_3Si(CH_3)_3$$

10 g. of propylene glycol laurate, and 65 g. of absolute ethanol. The resulting mixture was a clear, colorless solution and a thin film (Ca 10–15 microns thick) was formed to absorb greater than 90% of ultraviolet light having a wave length of from 2500 A. to 3100 A.

EXAMPLE VI

Gamma(p - aminobenzoyl)aminopropyltriethoxysilane, $(EtO)_3Si(CH_2)_3NHCO\ C_6H_4NH_2$, (0.6 g.) was dissolved in a mixture of ethanol (20 cc.) and water (5.0 cc.). The solution was filtered through glass wool and the filtrate warmed to 80–90° C. A glass slide, previously washed with hydrochloric acid solution followed by distill water, was immersed in the warm solution for 2 min. The slide was removed and air dried. An opaque film formed. The slide was then heated at 250° C. for 10 min. The resulting film was somewhat hazy, but could not be removed by rubbing or by standing in water for 5 hrs. at room temperature. A slide having a film thickness of approximately 20 microns absorb greater than 90% of ultraviolet light having a wave length of from 2500 A. to 3100 A.

EXAMPLE VII

In order to show the resistance of the sunburn preventive compositions to leaching out by water, the following illustration is given.

Distilled water (250 cc. at 250° C.) was placed into a separatory funnel and 10 ml. of siloxane oil having the average formula:

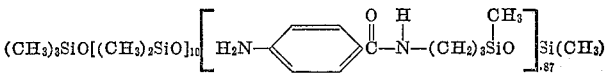

was added. The mixture was shaken vigorously for 60 seconds. The emulsion formed was broken by means of an induction coil. A 25 ml. aliquot of the aqueous phase was removed for titration. Almost no titratable amino nitrogen was formed in the aliquot indicating that the material is not readily extracted by water.

The above procedure was followed for a saturated solution (8.0 g./100 ml.) of p-aminobenzoic acid in a siloxane oil having the average formula:

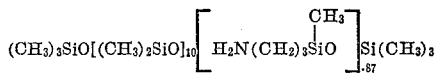

A 25 ml. aliquot of the water phase was removed and titrated. The amount of titratable amino nitrogen was equivalent to the removal of 48% of the para-aminobenzoic acid.

EXAMPLE VIII

An organosilicon compound having the general formula:

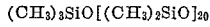
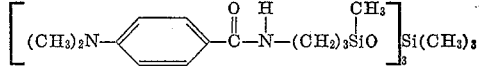

can be prepared similarly as described in Examples II and III with the exception that one employs 20 parts by weight of an aminoalkylsilicon oil of the formula:

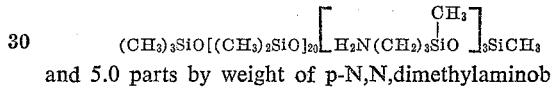

and 5.0 parts by weight of p-N,N,dimethylaminobenzoic acid.

This organosilicon compound prepared above can be formulated with a carrier to yield a sunburn preventive composition.

EXAMPLE IX

An organosilicon compound having the general formula:

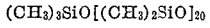
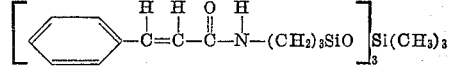

can be prepared similarly as described in Examples II and III with the exception that one employs 20 parts by weight of an aminoalkylsilicon oil of the formula:

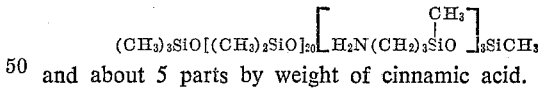

and about 5 parts by weight of cinnamic acid.

This organosilicon compound prepared above can be formulated with a carrier to yield a sunburn preventive composition.

EXAMPLE X

An organosilicon compound having the general formula:

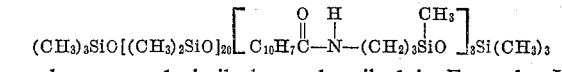

can be prepared similarly as described in Examples II and III with the exception that one employs 20 parts by weight of an aminoalkylsilicon oil of the formula:

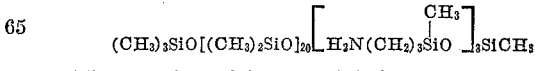

and 5.2 parts by weight of naphthoic acid.

This organosilicon compound prepared above can be formulated with a carrier to yield a sunburn preventive composition.

EXAMPLE XI

An organosilicon compound having the general formula:

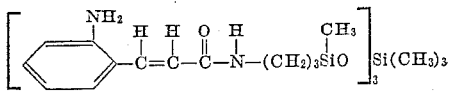

can be prepared similarly as described in Examples II and III with the exception that one employs 20 parts by weight of an aminoalkylsilicon oil of the formula:

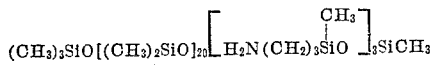

and 4.8 parts by weight of O-aminocinnamic acid.

This organosilicon compound prepared above can be formulated with a carrier to yield a sunburn preventive composition.

What is claimed is:

1. A sunburn preventive to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein an organosilicon compound containing at least one silicon-bonded acylaminoalkyl group of the formula:

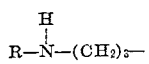

wherein R is a member selected from the class consisting of ortho and para-aminobenzoyl groups, ortho and para (N-alkyl)aminobenzoyl groups, ortho and para-(N,N-dialkyl)aminobenzoyl groups, salicoyl groups, cinnamoyl groups and naphthoyl groups, said organosilicon compound is selected from the class consisting of organosilanes having at least one valence of silicon, other than the valence satisfied by the acylaminoalkyl groups satisfied by an alkoxy group attached to silicon by an oxygen-silicon bond, the remaining valences of silicon being satisfied by a member of the group consisting of monovalent hydrocarbon groups and alkoxy groups and organopolysiloxanes having all the valences of silicon other than the valences satisfied by said acylaminoalkyl group and siloxane linkages, satisfied by monovalent hydrocarbon groups.

2. A sunburn preventive cream composition comprising in admixture with cream base material an organosilicon compound containing at least one silicon-bonded acylaminoalkyl group of the formula:

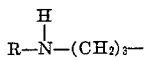

wherein R is a member selected from the class consisting of ortho- and para-aminobenzoyl groups, ortho- and para-(N-alkyl)aminobenzoyl groups, ortho- and para(N,N-dialkyl)aminobenzoyl groups, salicoyl groups, cinnamoyl groups and naphthoyl groups, said organosilicon compound is selected from the class consisting of organosilanes having at least one valence of silicon, other than the valence satisfied by the acylaminoalkyl groups, satisfied by an alkoxy group attached to silicon by an oxygen-silicon bond, the remaining valences of silicon being satisfied by a member of the class consisting of alkoxy groups and monovalent hydrocarbon groups and an organopolysiloxane having all the valences of silicon other than the valences satisfied by said acylaminoalkyl group and siloxane linkages, satisfied by monovalent hydrocarbon groups.

3. Sunburn preventive compositions comprising in admixture with propylene glycol laurate, and ethanol an organosilicon compound containing at least one silicon-bonded acylaminoalkyl group of the formula:

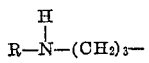

wherein R is a member selected from the class consisting of ortho- and para-aminobenzoyl groups and N-substituted ortho- and para-aminobenzoyl groups, salicoyl groups, cinnamoyl groups and naphthoyl groups, said organosilicon compound is selected from the class consisting of organosilanes having at least one valence of silicon other than the valence satisfied by the acylaminoalkyl group, satisfied by an alkoxy group attached to silicon by an oxygen-silicon bond, the remaining valences of silicon being satisfied by a member of the class consisting of monovalent hydrocarbon groups and alkoxy groups and an organopolysiloxane having all the valences of silicon other than the valences satisfied by said acylaminoalkyl group and siloxane linkages, satisfied by monovalent hydrocarbon groups.

4. A composition as claimed in claim 1 wherein the organosilicon compound is gamma-(para-(N-n-butyl)-aminobenzoyl)aminopropyltriethoxysilane.

5. A composition as claimed in claim 1 wherein the organosilicon compound is a copolymeric organosiloxane having the general formula:

wherein $x$ is an integer having a value of at least 1 and $y$ is an integer having a value of at least 1.

6. A composition as claimed in claim 1 wherein the organosilicon compound is a copolymeric siloxane having the general formula:

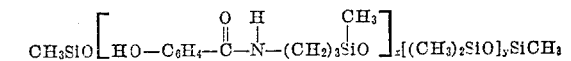

wherein $x$ is an integer having a value of at least 1 and $y$ is an integer having a value of at least 1.

7. A sunburn preventive composition comprising in admixture with lanolin, mineral oil and water, an organosilicon compound of the general formula:

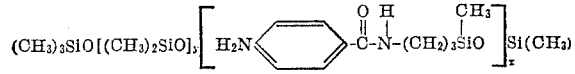

wherein $x$ is an integer having a value of at least 1 and $y$ is an integer having a value of at least 1.

8. A sunburn preventive composition comprising in admixture with propylene glycol laurate and ethanol, an organosilicon compound of the general formula:

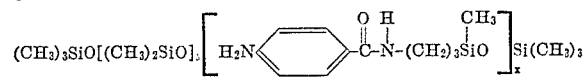

wherein $x$ is an integer having a value of at least 1 and $y$ is an integer having a value of at least 1.

9. A sunburn preventive to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein an organosilane having the formula:

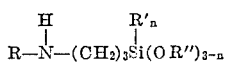

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group, R" is an alkyl group and $n$ is an integer having a value of from 0 to 2.

10. A sunburn preventive cream composition comprising in admixture with cream base material an organosilane having the formula:

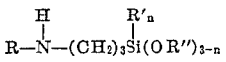

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group, R" is an alkyl group and $n$ is an integer having a value of from 0 to 2.

11. A sunburn preventive to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein an organosiloxane having the unit formula:

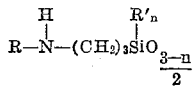

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group and $n$ is an integer having a value of from 0 to 2.

12. A sunburn preventive cream composition comprising in admixture with cream base material an organosiloxane having the unit formula:

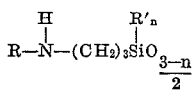

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group and $n$ is an integer having a value of from 0 to 2.

13. A sunburn preventive to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein a copolymeric organosiloxane containing at least one unit of an organosiloxane having the unit formula:

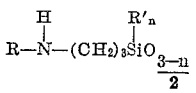

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group and $n$ is an integer having a value of from 0 to 2, and at least one siloxane unit having the unit formula:

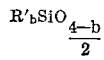

wherein R' is defined above and $b$ is an integer having a value of from 0 through 3.

14. A sunburn preventive cream composition comprising in admixture with cream base material a copolymeric organosiloxane containing at least one unit of an organosiloxane having the unit formula:

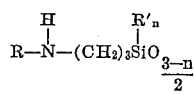

wherein R is a member selected from the class consisting of ortho and para-aminobenzoyl groups, ortho and para (N-alkyl)aminobenzoyl groups, ortho and para(N,N-dialkyl) aminobenzoyl groups, salicoyl groups, cinnamoyl groups and naphthoyl groups, R' is a monovalent hydrocarbon group and $n$ is an integer having a value of from 0 to 2, and at least one siloxane unit having the unit formula:

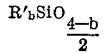

wherein R' is defined above and $b$ is an integer having a value of from 0 through 3.

References Cited in the file of this patent

UNITED STATES PATENTS

| | | |
|---|---|---|
| 2,928,858 | Morehouse | Mar. 15, 1960 |
| 2,929,829 | Morehouse | Mar 22, 1960 |

OTHER REFERENCES

Currie: J. Soc. of Cos. Chemists, 7:3, May 1956, pages 1–15.

Giese: J. Amer. Pharm. Asso., Sci. Ed., January 1950, pages 30–36.

Sagarin: Cosmetics Sci. and Tech., Interscience, New York, 1957, pages 197–204.

UNITED STATES PATENT OFFICE
CERTIFICATE OF CORRECTION

Patent No. 3,068,153            December 11, 1962

Edward L. Morehouse

It is hereby certified that error appears in the above numbered patent requiring correction and that the said Letters Patent should read as corrected below.

Column 6, lines 41 to 43, the formula should appear as shown below instead of as in the patent:

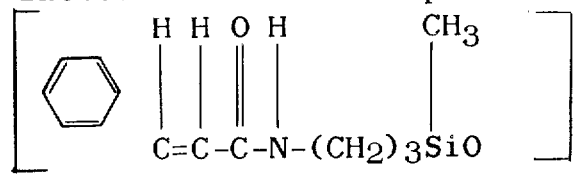

column 6, lines 49 and 65, and column 7, line 14, the right-hand portion of each formula should appear as shown below instead of as in the patent:

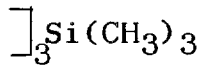

column 8, line 33, the left-hand portion of the formula, for "CH3SiO" read -- (CH3)3SiO --; same line 33, right-hand portion of the formula, for "SiCH3" read -- Si(CH3)3 --; column 8, lines 40 to 42, for "Si(CH3)" read -- Si(CH3)3 --.

Signed and sealed this 22nd day of October 1963.

(SEAL)
Attest:
ERNEST W. SWIDER
Attesting Officer

EDWIN L. REYNOLDS
Acting Commissioner of Patents